W. H. TAMBLING.

Churn.

No. 62,785.

Patented March 12, 1867.

Witnesses:
V. D. Stockbridge
A. A. Yeatman

Inventor:
Wm H Tambling
per
Alexander & Mason
Atty

United States Patent Office.

WILLIAM H. TAMBLING, OF MAZO MANIE, WISCONSIN.

Letters Patent No. 62,785, dated March 12, 1867.

IMPROVEMENT IN CHURNS.

*The Schedule referred to in these Letters Patent and making part of the same.*

TO ALL WHOM IT MAY CONCERN:

Be it known that I, WILLIAM H. TAMBLING, of Mazo Manie, in the county of Dane, and in the State of Wisconsin, have invented certain new and useful improvements in Churns, and do hereby declare that the following is a full, clear, and exact description thereof, reference being had to the accompanying drawings, and to the letters of reference marked thereon.

Figure 4:
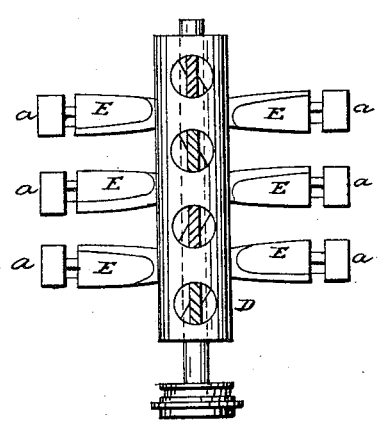
Figure 1:
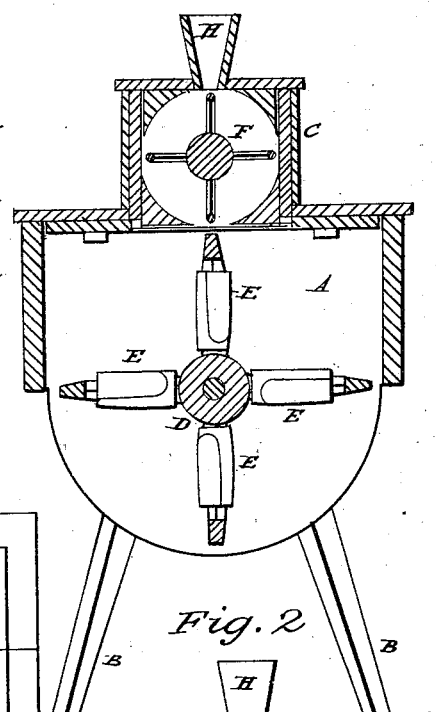
Figure 3:
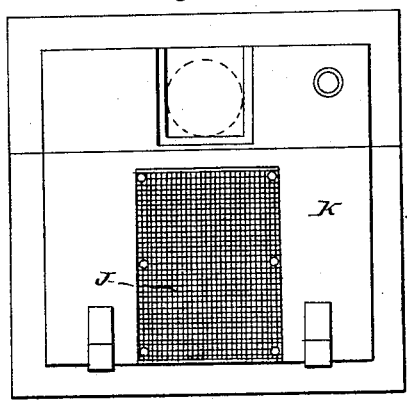
Figure 2:
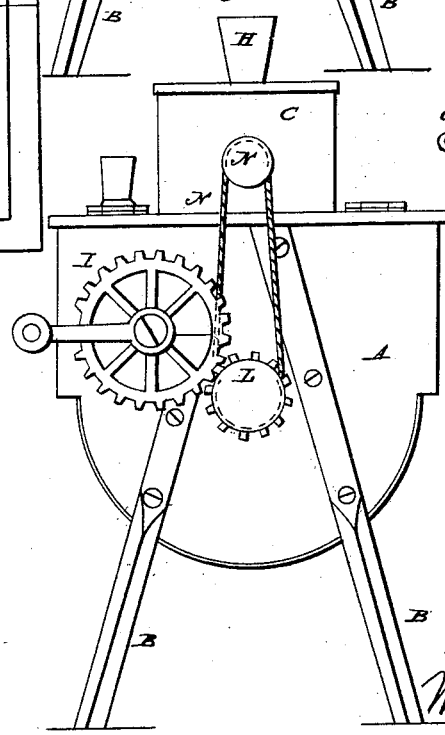
Figure 5:
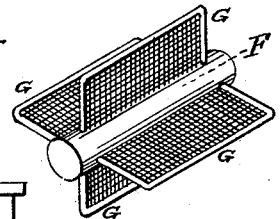

In the annexed drawings, making part of this specification, A represents the churn-box, which is made with a curved bottom and supported upon the legs B B. This box is provided with a horizontal dasher shaft, D, which has its bearings in the end of the box A, and which is provided with a series of arms, E E. The arms E are provided on their outer ends with small paddles, $a\ a$, which stand to the shaft at a different inclination from the arms themselves. The arms are flat upon their sides, but are so turned when secured to their shaft, that each alternate arm throws the cream or milk in an opposite direction. Secured upon the box A is a cover, K, which has erected upon it a supplementary box, C, which said box is provided with a dasher shaft, F, and an elongated hopper or funnel, H. The shaft F is provided with wings of gauze wire, G G. The inside of box C is cylindrical, as shown in Figure 1. There is an opening in the bottom of box C, which leads into the churn-box A, and this opening is covered with gauze wire, seen Figure 3, and marked J. I represents a driving-wheel, which is provided with teeth, and which is secured to the end of box A by a short shaft, on which it turns. The wheel I meshes into a gear-wheel, L, on the end of the shaft D, and serves to give it motion. M represents a band, which passes around a pulley on shaft D, and also around a pulley on shaft F, and serves to communicate motion to said shaft F.

In using this churn the dashers are set in motion by revolving the wheel I, the band M at the same time giving a rapid motion to the shaft F, with its wings. The cream or milk, after being properly tempered, is poured through the funnel or hopper H, and reaches the wings G in a thin extended stream. The wings G operate upon it and break it up, and it then passes down through bottom J to the lower box, where it is operated upon by the arms and paddles forming dashers upon shaft D. By the two shafts, with their arms and wings, the cream is so broken to pieces that the butter is driven from it in an incredibly quick time.

Having thus fully described my invention, what I claim as new, and desire to secure by Letters Patent, is—

The arrangement of the boxes A and C, the one provided with the arms E E and paddles $a\ a$, and the other provided with gauze-wire wings and bottom, the two being constructed and used as and for the purpose specified.

In testimony that I claim the foregoing I have hereunto set my hand and seal this 18th day of January, 1867.

W. H. TAMBLING.

Witnesses:
C. M. ALEXANDER,
J. M. MASON.